H. E. HANSEN.
PROCESS OF RETAINING MILK IN FRESH CONDITION.
APPLICATION FILED SEPT. 7, 1910.
994,641.
Patented June 6, 1911.
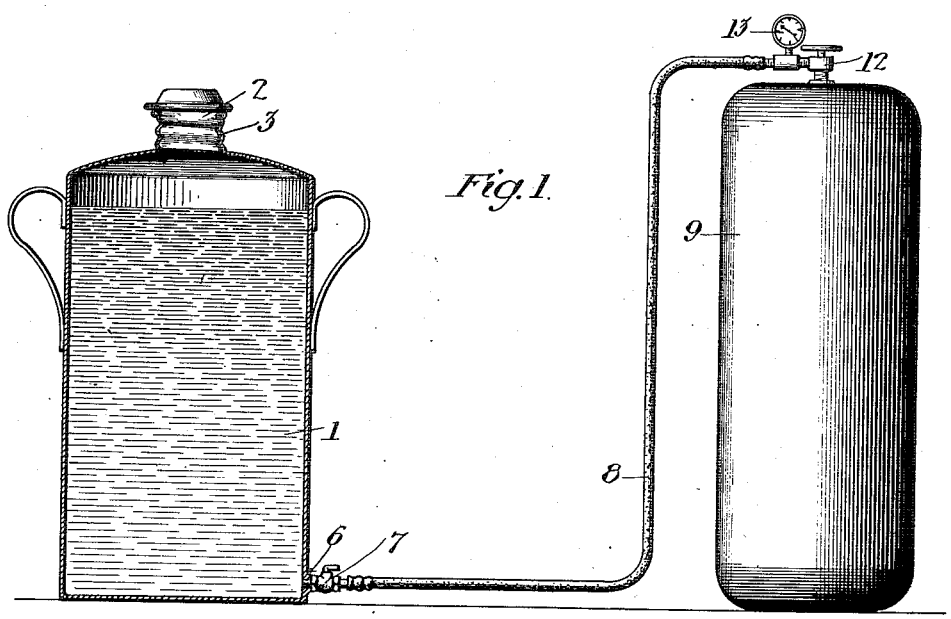
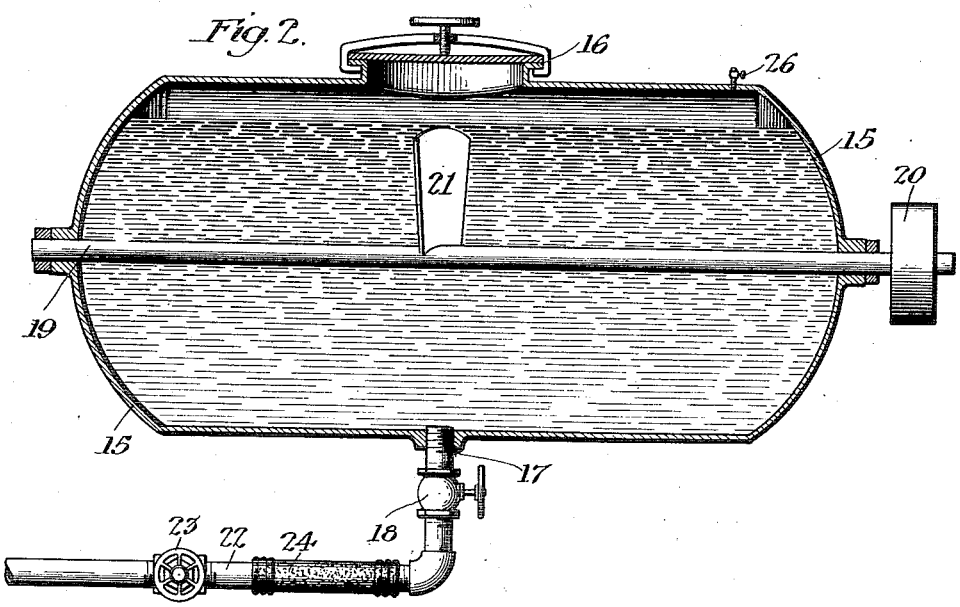

UNITED STATES PATENT OFFICE.

HARALD EMIL HANSEN, OF LOS ANGELES, CALIFORNIA.

PROCESS OF RETAINING MILK IN FRESH CONDITION.

994,641.  Specification of Letters Patent.  Patented June 6, 1911.

Application filed September 7, 1910. Serial No. 580,936.

*To all whom it may concern:*

Be it known that I, HARALD EMIL HANSEN, a subject of the King of Denmark, residing at Los Angeles, in the county of Los Angeles and State of California, have invented a new and useful Process of Retaining Milk in Fresh Condition, of which the following is a specification.

The object of my invention is to provide a cheap and effective process whereby a large percentage of the microbes or bacilli is destroyed and the germination or propagation thereof prevented in cow's milk, thereby maintaining such milk in sweet or fresh state.

I have discovered that milk can be retained in its sweet or fresh condition for a considerable period, sufficient to cover the time required for transportation, and for ordinary storage, by subjecting it to the action of carbonic acid gas in the manner hereinafter set forth, and then reducing the pressure of the gas so as to restore the milk to substantially atmospheric pressure, but retaining an atmosphere of carbonic acid gas in contact with the milk, whereby the milk is delivered free from effervescence and in a condition in which it can be used in the same manner as ordinary milk, the process having no effect on the appearance or quality of the milk and not interfering with the rising of the cream in the usual manner.

The accompanying drawings illustrate apparatus suitable for carrying out the invention.

Figure 1 is a vertical section of a can showing an elevation of the apparatus for supplying carbonic acid gas thereto, said can being adapted for shipping purposes or for treatment of the milk or other fluid on a comparatively small scale. Fig. 2 is a vertical section of a tank for treating milk or other fluid on a large scale.

Referring to Fig. 1 a can 1 which may be of usual shape and dimensions for shipping is provided at the top with a cover 2 screwing into a screw-threaded neck 3 so as to give a gas-tight joint. In the lower part of the can is provided an inlet 6 for carbonic acid gas, said inlet having a valve 7 and being adapted for connection to a hose or flexible pipe 8 leading to any suitable source of carbonic acid gas, for example, a gas holder or tank 9, provided with a valve 12 and with a pressure gage 13.

In carrying out my process by the use of the apparatus shown in Fig. 1, milk is placed in the can 1, the cover 2 having first been removed, after which the cover 2 is screwed down tight and the connection to the carbonic acid gas holder 9 having been made, the valve 7 is opened, allowing the carbonic acid gas to pass into the body of milk in the tank 1, the gas being admitted until the pressure reaches say, 60 pounds per square inch, the carbonic acid gas then present in the milk being sufficient to kill a large proportion of the microbes, and the pressure thereof insufficient to cause separation of the casein from the milk.

The killing of the microbes is substantially instantaneous upon the subjection of the milk to the gas, the valve 7 being then shut and the connection to the carbonic acid supply being removed. At any time thereafter the pressure of the gas may be reduced, for example, by turning the can on its side and opening the valve 7, the carbonic acid gas being thereby allowed to flow out until the pressure within the can approximately equalizes with that of the atmosphere, sufficient pressure being, however, left in the can to exclude the atmospheric air, the residual pressure being slightly in excess of the atmosphere. The removal of pressure from the carbonic acid gas is preferably effected before the milk is shipped so that the milk can be shipped under atmospheric pressure in the same manner as untreated or pasteurized milk without any special provisions for retaining pressure thereon and I have found that subjecting milk to the action of carbonic acid gas will preserve the same even after removal of the pressure of the gas and the milk can be shipped without liability of becoming sour.

The initial treatment with the carbonic acid gas under pressure is found to be sufficient to considerably reduce the number of live microbes in the milk and to reduce the activity of the remaining microbes in such manner that in the absence of air which is insured by the retention of an atmosphere of carbonic acid gas on the milk, there is not only no further development but a gradual decrease in the number of live microbes in the milk.

It will be understood from the above description that the gases originally in the milk will be displaced in part by the carbonic acid gas, such gases accumulating with the excess of carbonic acid gas in the upper part of the can and escaping together with such excess of carbonic acid gas, from the can when the can is turned on its side and the valve 7 is opened. When the valve 7 is opened in this manner, the carbonic acid gas which has been absorbed by the milk by reason of the condition of pressure, escapes from the liquid, leaving only that amount in the liquid which is retainable by the liquid at atmospheric pressure. With a small body of milk such as that in the can, a moderate time of exposure to the atmosphere in this manner is sufficient to release substantially all of the excess of carbonic acid gas due to the original charge under pressure, and the amount left in the milk is not sufficient to affect the taste or render it in any way materially different from sweet or fresh milk, except as regards the reduction of active microbes.

In carrying out the process on a large body of milk as will be necessary in a large plant, it is desirable to provide special means for incorporating the carbonic acid gas into the body of milk and releasing it therefrom. In Fig. 2 the tank 15 which is provided with a man-hole at the top for filling and cleaning and with an outlet 17 at the bottom having a valve 18, is further provided with a shaft 19, driven by pulley 20 and carrying a blade or paddle 21, is adapted to stir or agitate the milk. The supply pipe 22 for carbonic acid gas leads to any suitable source for such gas and is provided with the valve 23 and with a flexible hose 24 for detachable connection to outlet 17. The process is carried out in this apparatus as above described except that the paddle or agitator means is kept in operation during the process so as to facilitate thorough mixture of carbonic acid gas with the milk and to expedite removing the carbonic acid gas from the milk when the gas is released through the valve 26 in the top of the tank, and to prevent separation of the cream from the milk, after the carbonic acid gas is released and it is desired to draw off the milk.

What I claim is:

1. The process of retaining milk in fresh condition, which consists in passing carbonic acid gas into the milk under pressure, and subsequently reducing the pressure and retaining on the milk an atmosphere of carbonic acid gas at substantially atmospheric pressure in contact with the milk.

2. The process of retaining milk in fresh condition, which consists in subjecting the milk to the action of carbonic acid gas and retaining the milk in an atmosphere of carbonic acid gas at substantially atmospheric pressure.

3. The process of retaining milk in fresh condition, which consists in forcing carbonic acid gas under pressure into the body of milk, agitating the body of milk to incorporate the carbonic acid gas therewith, exposing the body of milk to atmospheric pressure and agitating the milk to release approximately all of the carbonic acid gas therefrom.

In testimony whereof, I have hereunto set my hand at Los Angeles, California, this 31st day of August 1910.

HARALD EMIL HANSEN.

In presence of—
ARTHUR P. KNIGHT,
FRANK L. A. GRAHAM.